United States Patent

Stählin

(10) Patent No.: US 9,143,960 B2
(45) Date of Patent: Sep. 22, 2015

(54) METHOD FOR INDICATING THE FUNCTIONAL CAPABILITY OF THE VEHICLE-TO-ENVIRONMENT COMMUNICATION IN ISM RADIO BANDS

(75) Inventor: Ulrich Stählin, Eschborn (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 14/114,114

(22) PCT Filed: Mar. 28, 2012

(86) PCT No.: PCT/EP2012/055477
§ 371 (c)(1),
(2), (4) Date: Oct. 25, 2013

(87) PCT Pub. No.: WO2012/146454
PCT Pub. Date: Nov. 1, 2012

(65) Prior Publication Data
US 2014/0051430 A1  Feb. 20, 2014

(30) Foreign Application Priority Data

Apr. 26, 2011 (DE) .................. 10 2011 018 572

(51) Int. Cl.
*H04W 4/00* (2009.01)
*H04W 24/02* (2009.01)
*H04W 24/00* (2009.01)
*H04W 28/04* (2009.01)
*H04W 72/00* (2009.01)
*H04W 84/00* (2009.01)
*H04W 84/18* (2009.01)

(52) U.S. Cl.
CPC .............. *H04W 24/02* (2013.01); *H04W 24/00* (2013.01); *H04W 28/04* (2013.01); *H04W 72/00* (2013.01); *H04W 84/005* (2013.01); *H04W 84/18* (2013.01)

(58) Field of Classification Search
CPC ..... H04W 24/00; H04W 28/04; H04W 72/00; H04W 84/005; H04W 84/18; H04W 24/02
USPC .................................. 455/423, 517; 370/329
See application file for complete search history.

(56) References Cited

U.S. PATENT DOCUMENTS

| 2003/0133409 A1 | 7/2003 | Corazza |
| 2004/0073361 A1 | 4/2004 | Tzamaloukas et al. |
| 2009/0185489 A1 | 7/2009 | Ruffini et al. |
| 2011/0034201 A1* | 2/2011 | Hamada et al. ............... 455/517 |

(Continued)

FOREIGN PATENT DOCUMENTS

| EP | 2 288 190 A1 | 2/2011 |
| WO | WO 01/24568 A1 | 4/2001 |

(Continued)

*Primary Examiner* — Charles Shedrick
(74) *Attorney, Agent, or Firm* — Cozen O'Connor

(57) ABSTRACT

A method and a communications unit carrying out the method detects communications problems in the vehicle-to-environment communications in an ISM radio band. To determine the functional ability or the performance capacity of vehicle-to-environment communications, the channel usage of the ISM radio band in use is determined by comparing the channel time occupied by communication messages to the maximum channel time available for communication messages. A warning message is output if the occupied channel time exceeds a threshold value.

5 Claims, 2 Drawing Sheets

(56) References Cited

U.S. PATENT DOCUMENTS

2011/0044172 A1    2/2011    Yim et al.
2011/0098877 A1    4/2011    Staehlin et al.
2012/0184321 A1    7/2012    Baldessari et al.

FOREIGN PATENT DOCUMENTS

WO    WO 2006/011109 A1    2/2006
WO    WO 2009/074655 A1    6/2009
WO    WO 2011/038881 A1    4/2011

* cited by examiner

METHOD FOR INDICATING THE
FUNCTIONAL CAPABILITY OF THE
VEHICLE-TO-ENVIRONMENT
COMMUNICATION IN ISM RADIO BANDS

CROSS-REFERENCE TO RELATED
APPLICATIONS

This is a U.S. national stage of application No. PCT/EP2012/055477, filed on 28 Mar. 2012, which claims priority to the German Application No.: 10 2011 018 572.0, filed 26 Apr. 2011, the content of both incorporated herein by reference.

BACKGROUND OF THE INVENTION

1. Field of the Invention

The invention relates to a method and a correspondingly configured communications unit, in particular of a motor vehicle, for detecting communications problems in vehicle-to-environment communication in an ISM radio band.

2. Prior Art

The ISM radio band is a radio band that can be used without a license by devices in the industrial, scientific and medical sector provided that the specifications, in particular with respect to the duty cycle, are complied with. In this case, the abbreviation ISM stands for "Industrial, Scientific and Medical". The license-free ISM radio band is also used, in particular, by wireless access and driving authorization communication in motor vehicles, which is also called "RKE (Remote Keyless Entry)". Frequency bands at 434 MHz and 868 MHz with transmission powers of 10 dBm and 14 dBm, respectively, are available in the European Union as the RKE communications band. Further typical communications bands are the band around 2.4 GHz and the band at 5 GHz, which are primarily used for WLAN, Bluetooth, etc.

The present invention can generally be used in radio bands that are not provided with overload monitoring with congestion control. This also applies, in particular, to the communications protocols of the license-free ISM radio bands.

WO 2009/074655 A1 discloses a method for transmitting vehicle-relevant data relating to a vehicle via mobile communications devices, in which two different communications paths are used. A first communications path is WLAN-based communication. The second communications path is formed by "ignition key" communication, which takes place in a license-free ISM band.

However, there is the problem that the frequency bands of license-free ISM communication are also used by a large number of other communications devices. In motor vehicles, these include, for example, a tire pressure monitoring system (TPMS), baby monitors, radio headphones, consumption recording systems and the like. In urban environments in particular, the radio channel may therefore be so highly utilized that proper communication is no longer possible.

SUMMARY OF THE INVENTION

An object of the invention is therefore to determine whether vehicle-to-environment communication can reliably operate in a license-free ISM radio band, in which case the result of this determination is at least intended to be indicated.

According to an aspect of the invention, this object is achieved with a method in which provision is made for the channel usage of the ISM radio band used to be determined by comparing the channel time occupied by communication messages with the maximum channel time available for communication messages, and outputting a warning message if the occupied channel time exceeds a threshold value.

The exceeding of the threshold value can be determined by an absolute value of the occupied channel time, but preferably relative to the maximum channel time available for communication messages in the communications protocol. The occupied channel time can be easily determined by virtue of the receiving device of the communications unit for vehicle-to-environment communication receiving all communication messages transmitted in the ISM radio band and measuring the time occupied by these communication messages.

In another aspect, this channel time occupied by communication messages can be related to the maximum available transmission time predefined in the communications protocol, in the case of relative determination of the exceeding of the threshold value.

According to one preferred embodiment, a first warning message is output if a first threshold value is exceeded and a second warning message is output if a second threshold value is exceeded. Useful threshold values for the first warning message are approximately of the order of magnitude of 30% channel usage and useful threshold values for the second warning message are approximately 50% channel usage, for example. A 30% channel usage already would result in that time-critical communication messages being delayed under certain circumstances such that these messages no longer work very reliably under certain circumstances for functional units dependent on time-critical information. However, it can be expected that these communication messages will still reach the functional units within conventional response times. In contrast, considerable delays can be expected if a threshold value of approximately 50% channel usage is exceeded.

According to one further aspect of the method according to the invention, the number of defective and/or unusable communication messages in vehicle-to-environment communication in the ISM radio band is additionally determined over a period of time which may be predefined in an adjustable manner, in which case a warning message is output if a threshold value is exceeded. In contrast to monitoring the temporal usage of the transmission channel by determining the channel time occupied by the communication messages in comparison with the maximum channel time available for communication messages, monitoring the defective and/or unusable communication messages not only results in prediction of possible disruptions but also results in detection of actual disruptions in communication in the ISM radio band. These should also be communicated in order to be able to estimate the current reliability of vehicle-to-environment communication.

A similar situation applies to another possibility for checking the reliability of vehicle-to-environment communication in a license-free ISM radio band, in which the latency for transmitting a communication message in vehicle-to-environment communication in the ISM radio band is determined and a warning message is output if a threshold value is exceeded. Latency is the propagation delay of a communication message between transmission and reception. The minimum latency is given by the physical propagation time in the radio channel. However, during high usage of the radio channel, greater latencies are produced which, when threshold values are reached, can indicate a transmission speed which is no longer appropriate for transmission.

If necessary, a first threshold value and a second threshold value can also be used both when determining the latency and when determining the number of defective and/or unusable communication messages, depending on the strength of the effects on radio communication in the ISM radio channel.

In order to counteract a further load on the ISM radio channel in the case of high usage, another aspect of the invention provides for the data transmission repetition rate to be reduced if a threshold value is reached. A separate threshold value can be stipulated for this purpose. However, the same threshold value as that used in the above checks for generating the warning message is preferably used. If necessary, the repetition rate can be reduced to a lesser extent if a first threshold value is reached than if a second threshold value is reached.

With a conventional repetition rate of approximately 1 Hz, the repetition rate can be gradually reduced to 0.5 Hz or 0.33 Hz, for example, if a threshold value is reached. This is preferably effected in a communications unit having both a receiver and a transmitter. The receiver in this communications unit evaluates the radio channel and controls the transmission of the communication messages using the associated transmitter. If necessary, a separate communication message for temporarily reducing the repetition rate can also be transmitted to other transmitters that are participating in C2X communication in the ISM radio band and then also transmitted at a reduced repetition rate.

In continuation of this concept, in another aspect, the repetition rate can be reduced only for non-safety-critical functions, with the result that the safety-critical functions are prioritized in radio communication in the ISM radio band. It is also possible to reduce the repetition rate for safety-critical functions to a lesser extent than for non-safety-critical functions.

Finally, according to yet another aspect of the invention, the provided warning message can be output to a human-machine interface for indication. This can be effected on a central display of the human-machine interface for warning or fault messages in a vehicle. Alternatively or additionally, a light may also be provided in the dashboard, which light, for example, displays different colors when the different warning thresholds are reached. In the case of remote monitoring, the warning message may also be indicated in a control center, for example a traffic control center. This allows the method according to the invention to also be used in applications which do not take place in a motor vehicle but rather, for example, in permanently installed participants in vehicle-to-environment communication.

Finally, another aspect of the invention relates to a communications unit, preferably in a motor vehicle, for participating in vehicle-to-environment communication in an ISM radio band, having a transmitting and receiving unit set up to transmit and receive communication messages in an ISM radio band, and having an interface to a human-machine interface for indicating status and/or warning messages. According to the invention, the transmitting and receiving unit of the communications unit is configured to carry out the above-described method or parts of the method. It is thus possible for the communications unit to monitor the usage in the ISM radio channel and to indicate faults or output messages in the event of overloading.

Both within the scope of the method according to the invention and in the above-mentioned communications unit, the interface to the human-machine unit can also be used, according to the invention, to indicate internal faults of the communications unit, for example a communications unit that is no longer functioning, or a defective antenna. In the case of such a defect, the driver must look for a workshop.

Further advantages, features and possible uses of the present invention emerge from the following description of an exemplary embodiment and the drawing. In this case, all features described and/or graphically illustrated form the subject matter of the present invention on their own or in any desired combination, also irrespective of their combination in the claims or their dependency references.

DETAILED DESCRIPTION OF THE PRESENTLY PREFERRED EMBODIMENTS

The method for indicating the functional capability or reliability of vehicle-to-environment communication in ISM radio bands is provided, according to embodiments of the invention, in a communications unit, which participates in vehicle-to-environment communication. The communication unit may be installed, in particular, in a motor vehicle or, in other functional units or functional modules participating in vehicle-to-environment communication, in particular if the units or modules are monitored or at least regularly supervised by persons.

Figure 2:
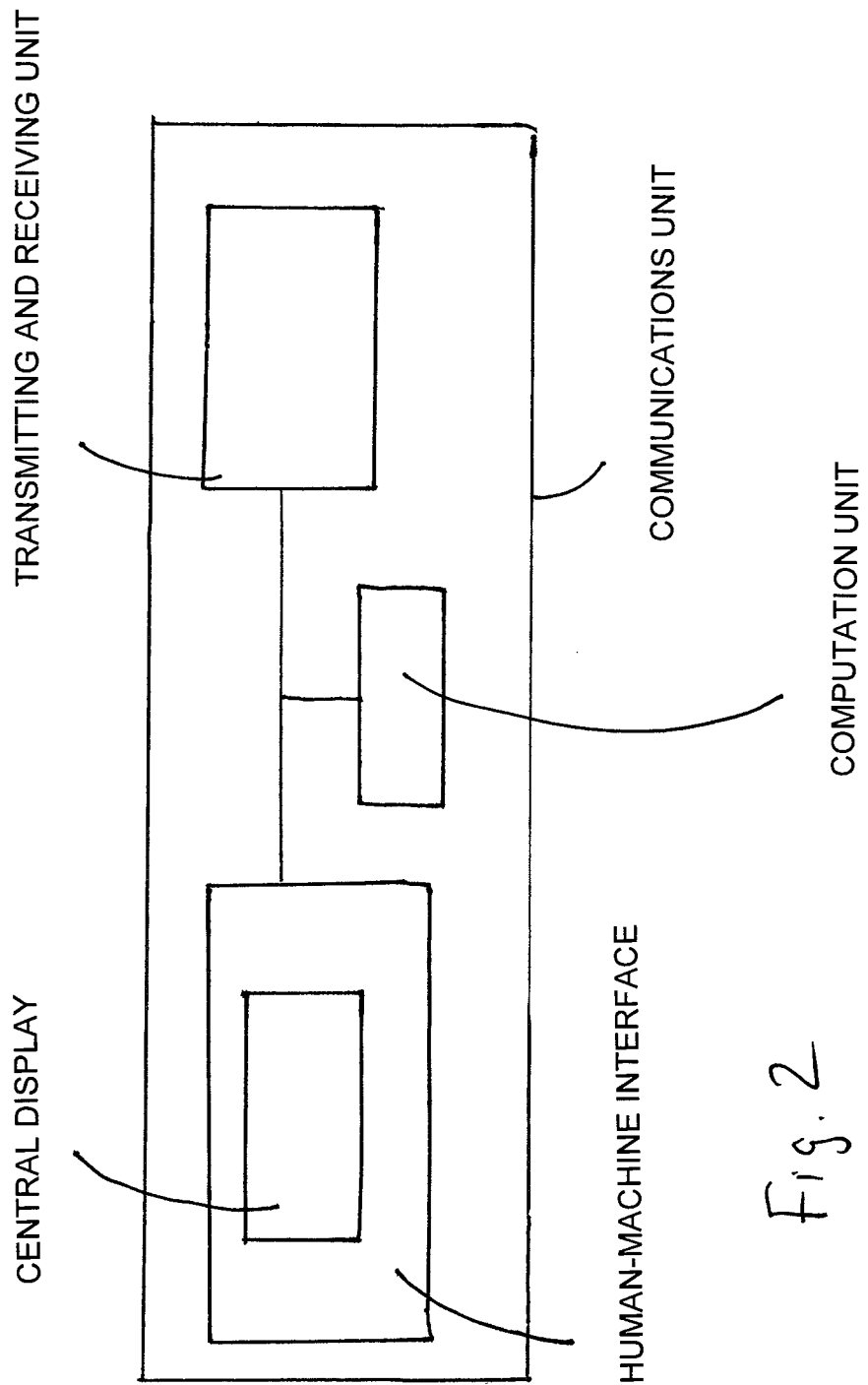
FIG. 2 is a diagram of the communications unit.

The communications units, an example of which is illustrated in FIG. 2, have a transmitting and receiving unit which, with a corresponding transmitter and receiver, is set up to transmit and receive communication messages in the ISM radio band. For this purpose, a suitable microprocessor for processing the communications protocol and for controlling the hardware contained in the transmitting and receiving unit is provided in the transmitting and receiving unit. The communications unit also has an interface to a human-machine interface (HMI) which can be used to transmit status and/or warning messages from vehicle-to-environment communication (C2X communication).

Figure 1:
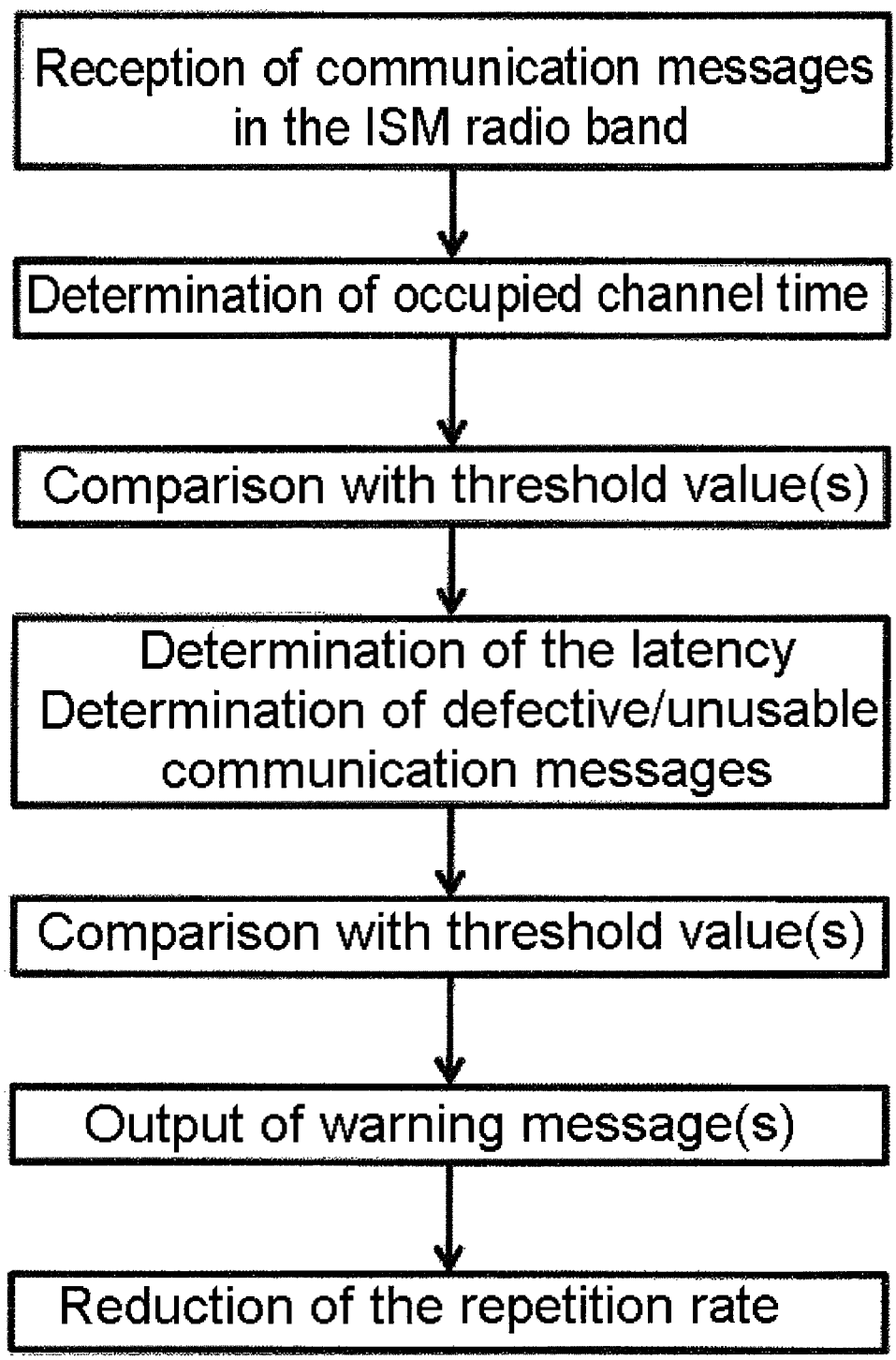
FIG. 1 schematically illustrates a flowchart for the sequence of the method according to the invention.

In order to check the functional capability of the radio channel, a method, schematically illustrated in FIG. 1, is implemented in the computation unit of the communications unit, in which method the communication messages in the ISM radio band are received by the receiver. In this case, the receiver is set up, in particular, to receive all of the communication messages which can be received in the ISM radio channel. Within the scope of the method, irrespective of whether the communication message belongs to vehicle-to-environment communication and is addressed to the receiver of this communications unit, every communication message is evaluated to the effect that the channel time occupied by the communication messages in the ISM radio band is determined.

This occupied channel time is compared with the maximum channel time that is available for communication messages in the ISM radio band and is predefined for the use of the license-free ISM radio bands within the scope of the communications protocol, and a percentage is determined therefrom.

This determined channel time is compared with threshold values, a warning message being output via the human-machine interface if the threshold value is exceeded.

This warning message may be, for example, a text and/or symbol indication on a central display of the human-machine interface of the vehicle or on another functional unit participating in vehicle-to-environment communication. The warning message may also be indicated by a light, for example in the dashboard of the motor vehicle, the light being adapted to light up in different colors if there are different threshold values.

Following the determination of the occupied channel time in comparison with the maximum available channel time in ISM radio communication, the latency, that is to say the signal delay in radio communication, is also determined and defective or unusable communication messages in the ISM radio band are determined. In the event of high usage of the radio band, the latency increases considerably. In the event of overloading and a large number of collisions of radio messages, defective and unusable communication messages also result and cannot be decoded by the receiver on account of disruptions.

The determined latency (signal propagation time) and the number of unusable or defective communication messages are also compared with threshold values, warning messages likewise being output in a suitable manner.

In order to avoid further increasing the channel usage if threshold values are exceeded, simultaneous reduction of data transmission repetition rate of a transmitter associated with the receiver may be implemented. For example, instead of a data repetition rate of 1 Hz, it could be possible to transmit only at a data repetition rate of 0.5 Hz, or even 0.33 Hz. The reduction in the data repetition rate can be reduced for functions that are not safety-critical. Alternatively, the repetition rate of non-safety-critical functions could also be reduced even further, for example to 0.2 Hz.

As a result of the current channel situation or load and/or packet errors and the latency being displayed, the driver of a vehicle is able to estimate whether C2X communication operates with sufficient accuracy via the ISM radio band (RKE communication).

In contrast to C2X communication via automotive WLAN according to the IEEE 802.11p standard, the channel usage is not monitored during communication via the ISM channel, since the channels used are not only reserved for vehicle-to-environment communication, but rather can be used for a multiplicity of applications which may result in high usage of this radio channel, in particular in the urban area.

In addition, no congestion control (overload monitoring with congestion control), in which important communication messages can be given preferential treatment in the event of a data jam and can therefore always be reliably transmitted, takes place for the channels in the ISM radio channel.

During C2X communication via automotive WLAN according to the IEEE 802.11p standard, it is likewise appropriate, in a manner similar to the described invention, to indicate the current state of congestion control using the central display in the human-machine interface. For example, a warning can be effected if the channel usage is very high and the latency therefore increases accordingly.

As a result of the invention, the user of vehicle-to-environment communication receives an indication of how reliably vehicle-to-environment communication is currently operating.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for detecting communications problems in vehicle-to-environment communication in an ISM radio band, the method comprising:
    determining channel usage of the ISM radio band by comparing a channel time occupied by communication messages with a maximum channel time available for communication messages;
    if the occupied channel time exceeds a first channel usage threshold value, outputting a first channel usage warning message indicating that the occupied channel time exceeds the first channel usage threshold value and reducing a data transmission repetition rate to a first repetition rate; and
    if the occupied channel time exceeds a second channel usage threshold value, higher than the first channel usage threshold value, outputting a second channel usage warning message indicating that the occupied channel time exceeds the second channel usage threshold value and reducing the data transmission repetition rate to a second repetition rate, lower than the first repetition rate,
    wherein the repetition rate is reduced only for non-safety-critical functions.

2. The method as claimed in claim 1, further comprising
    determining the number of defective and/or unusable communication messages in vehicle-to-environment communication in the ISM radio band over a predefined period of time; and
    outputting a defect warning message if a threshold value relating to defective and/or unusable communication messages is exceeded.

3. The method as claimed in claim 1, further comprising:
    determining the latency for transmitting a communication message in vehicle-to-environment communication in the ISM radio band; and
    outputting a latency warning message if a threshold value relating to latency is exceeded.

4. The method as claimed in claim 1, wherein the first and second channel usage warning messages are output to a human-machine interface for indication.

5. A communications unit for participating in vehicle-to-environment communication in an ISM radio band, comprising:
    a human-machine interface; and
    a transmitting and receiving unit configured to transmit and receive communication messages in an ISM radio band, and having an interface to the human-machine interface,
    wherein the transmitting and receiving unit is configured to carry out the method as claimed in claim 1.

* * * * *